United States Patent Office 3,362,567
Patented Jan. 9, 1968

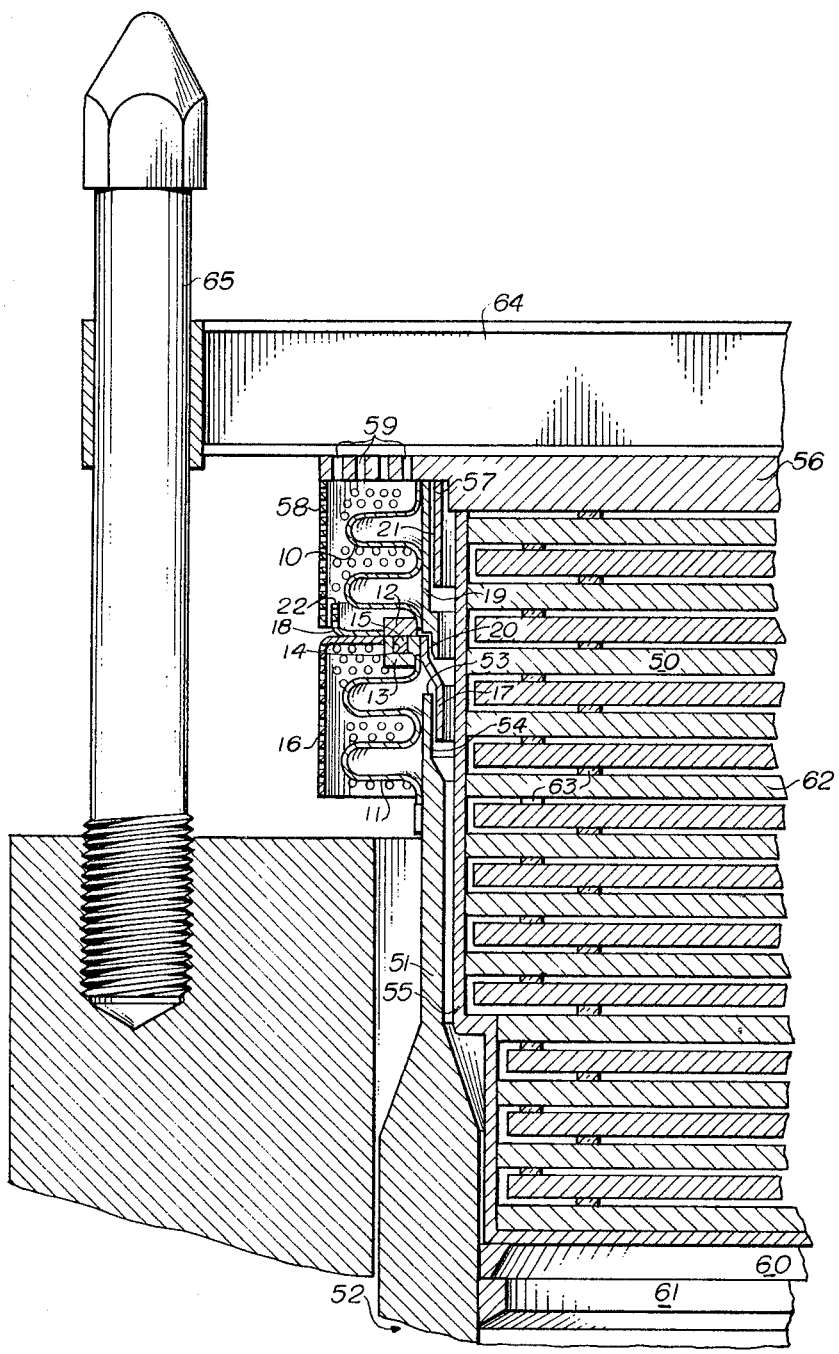

3,362,567
COMPLIANT FLANGE VESSEL CLOSURE
Eugene R. Rudock, Santa Cruz, Calif., assignor to the United States of America as represented by the United States Atomic Energy Commission
Filed June 7, 1965, Ser. No. 462,144
8 Claims. (Cl. 220—46)

ABSTRACT OF THE DISCLOSURE

A flexible bellows seal for a nuclear reactor cover in which a first bellows is attached to the cover and a second bellows is attached to the pressure vessel. The free end of each bellows is provided with an annular ring so that when the cover is in place, the two annular rings mate and form a seal with the two bellows in compression.

---

This invention relates to flange closure seals for vessels under pressure and in particular to flange seals for such vessels operating at elevated temperatures and having covers which must be frequently removed.

It is desirable in pressurized containment vessels for nuclear reactors to have covers which may be readily and easily removed and replaced without the necessity of laborious disengaging of bolts, dogs, clamps, or the like, each time the reactor is refueled or items are replaced or repaired within the containment vessel. During periods of refueling or repair, it is extremely difficult if not impossible for personnel to enter the area surrounding the reactor containment vessel because of excessive heat, presence of corrosive or noxious gases and possible excessive radioactivity. Thus, where fasteners are required to seal the cover to the reactor, they cannot be reached until the reactor has cooled down, the gases have been removed and radioactivity has been allowed to decay. To remove such fasteners before the reactor has cooled and radioactivity has subsided requires the use of remotely controlled special tools and grappling means costing large sums of money, thus increasing the capital cost of the reactor.

Although bellows systems having flange seals have been used in the past, their usual configuration is to have one half of the seal means at one end of the bellows and the other mating half on either the rigid flange of the pressure vessel or the flange of the pressure vessel cover. In addition, for systems of this type, the sealing material must be capable of operating at the same temperature as the pressure vessel. Thus, for pressure vessels operating at elevated temperatures, the cost and difficulty in maintaining a seal with materials current in the art increases in even greater proportion as the temperature increases.

In addition, for seals between rigid flanges, the mating surfaces must be carefully machined for both flatness as well as parallelism to prevent uneven or skew surfaces. When fastening such inaccurate flanges together, such excessive stresses may develop when pulling the uneven portions together that premature failure due to overstress may occur.

The seal of the present invention not only eliminates the requirement for careful machining to prevent skew, by arranging for mating sealing flange members between compliant bellows portions to be sealed by the low pressure exerted by the bellows. Also, by the particular arrangement of seal and bellows, the heat conducted from the pressure vessel cover as well as the pressure vessel is dissipated through both radiative as well as convective heat transfer before reaching the seal. Thus, the seal will operate at a lower temperature than that of the reactor containment vessel, increasing the service life of pliable seal members employed therein.

Accordingly, it is an object of this invention to provide a sealing means for a pressurized containment vessel requiring no fastening devices for securing the seal.

It is another object of this invention to provide a sealing means for a pressurized containment vessel wherein the seal is maintained at a lower temperature than the containment vessel.

It is a further object of this invention to provide a sealing means for a pressurized containment vessel wherein the seal is maintained by relatively low pressure exerted across sealing flange surfaces.

It is a further object of this invention to provide a sealing means for a pressurized containment vessel that inherently compensates for skew and uneven mating surfaces of the seal.

Other and more particular objects of this invention will be manifest upon study of the following detailed description when taken together with the accompanying drawing in which the single FIGURE 1 is an enlarged section through the upper portion of a typical pressurized reactor containment vessel showing a section through the seal device of this invention.

In general, the sealing arrangement of this invention comprises a compressive spring upper bellows 10 from which depends a flexible upper seal flange ring 12 mating with flexible lower seal flange ring 13 supported on a compressive spring lower bellows 11. Upper bellows 10 is sealed and affixed at the upper end as by welding or the like to the periphery of removable reactor vessel cover 50 while lower bellows 11 is sealed and affixed at the lower end as by welding or the like to the periphery of pressure resistant reactor containment vessel 52. Lower seal ring 13 is provided with a seal ring chase 14 in the embodiment illustrated in its upper surface forming upper seal ring 12 in which is fitted a deformable seal gasket ring 15. The seal is effected by the mating of the planar faces of upper and lower seal rings 12 and 13 against seal ring 15 when reactor vessel cover 50 is placed over the access port of reactor containment vessel 52. Upper and lower bellows 10 and 11, by virtue of their spring action, are effective in maintaining quadrant seal 15 under effective sealing pressure even for a slight upward movement of cover 50 as during an overpressure transient.

More specifically, lower bellows 11 of the lower half of the seal of this invention fits in sliding relation to the reactor containment vessel and is affixed and sealed along the lower edge thereof as by welding or the like to reactor vessel wall 51 at a location somewhat below lip 53 which defines the access port of reactor containment vessel 52. Reactor vessel wall 51 extending from the location of attachment of bellows 10 up to lip 53 thus acts as a guide to prevent sideways motion of said bellows 11. Affixed and sealed as by welding or the like to the end of said lower bellows 11 distal the point of attachment to reactor vessel wall 51 is lower seal ring 13. Thus, ring 13 is free to move up or down as lower bellows 11 expands or is compressed.

The outer periphery of lower seal ring 13 is affixed as by welding or the like to a lower bellows guard 16 in the form of a depending skirt which is bent downward from ring 13 in spaced apart relation with said lower bellows 11 to protect it from damage. Lower bellows guard 16 may be fabricated from any suitable heat resistant material having openings to permit escape of thermal energy by either radiation or convection, e.g., woven wire mesh, expanded metal screening, perforated metal sheeting, etc. Thus lower bellows guard 16 is free to move up or down with lower seal ring 13.

To the inner periphery of lower seal ring 13 is affixed as by welding or the like, a lower seal telescoping ring 17 which is arranged to extend downward over vessel lip 53 to fit in sliding relation along the inside of vessel wall 51 in rabbeted portion 54. Thus, the inside diameter of telescoping ring 17 may be the same as the inside diameter of reactor containment vessel 52 at wall 51 below rabbeted portion 54 providing an essentially uniform inner vessel diameter. Telescoping ring 17 will thus minimize the flow of material from reactor vessel 52 past vessel wall 51 into the folds of lower bellows 11.

In the upper surface of lower seal ring 13 facing upper seal ring 12 is provided a ring seal chase 14 in which is placed a compliant quadrant seal ring or gasket member 15. Further, the face of lower seal ring 13 adjacent seal chase 14 is provided with a smooth surface with which the lower face of upper seal ring 12 may mate to limit the deformation of gasket 15. Also, the depth of chase 14 is arranged so that quadrant seal ring 15 projecting therefrom is in compression when upper and lower seal rings 12 and 13 are in mating relation, thus effecting a fluid and gas-tight seal immediately on contact with quadrant ring seal 15. Although ring seal 15 is shown in the embodiment illustrated by FIGURE 1 as resting in chase 14 of lower seal ring 13, ring seal 15 may, alternatively, be placed in a retaining chase in the lower surface of upper seal ring 12 facing lower seal ring 13. In this configuration, the chase holding ring seal 15 must be of such a shape that it will retain said seal 15 when reactor vessel cover 50 is lifted off the reactor. To further facilitate ready replacement of seal 15 the peripheral portion of top plate portion 56 of reactor vessel cover 50 to which upper bellows 10 is attached may be fabricated as an annular ring. Thus by merely unbolting the annular ring, the flange may be removed and the gasket replaced without the need for removing the entire reactor vessel cover 50. This configuration will permit the cover to remain in place and act as a radiation shield while personnel are removing the flange. Quadrant seal 15 may be fabricated from any suitable gasketing material that will withstand relatively high temperatures and remain pliable and flexible, e.g., silicone-asbestos rings. In addition, seal 15 may assume other cross section configurations other than quadrant type, i.e., O rings, strip gaskets or the like, common in the art.

Looking now at the upper half of the seal of this invention which is a part of reactor cover 50, upper bellows 10 is affixed and sealed as by welding or the like a short distance inside the outer periphery of top plate portion 56 of reactor vessel cover 50. To act as a guide for upper seal telescoping guide 19 and to prevent sideways motion of upper bellows 10, top plate bellows guide 57 is preferably defined as a cylindrical ring of a diameter approximately equal to the diameter of inside vessel wall 51 of reactor vessel 52, below rabbeted portion 54. Top plate bellows guide 57 is affixed as by welding or the like to top plate portion 56 along the inner periphery or inside of the upper bellows 10 point of attachment to said top plate portion 56. Affixed and sealed as by welding or the like to the end of said upper bellows 10 distal the point of attachment to top plate portion 56 is upper seal ring 12. Thus ring 12 is free to move up or down as upper bellows 10 is compressed or expands.

To the outer periphery of upper seal ring 12 is affixed as by welding or the like, upper seal ring guard 18 provided with bent up portion 22 to protect seal ring 12 and upper bellows 10 from possible damage when bellows 10 is expanded while cover 50 is removed. Thus, upper seal ring guard 18 is free to move up or down with ring 12. To offer further protection from damage to upper bellows 10, upper bellows guard 58 is affixed as by welding or the like to the outer periphery of top plate portion 56 concentric and in spaced relation with upper bellows 10. It will be noted that bent up portion 22 moves in telescopic relationship immediately inside upper bellows guard 58. This arrangement permits compression of upper bellows 10 sufficiently to achieve adequate compressive force on the seal, yet not allow portions of the structure to extend beyond the face of upper seal ring 12.

Both upper seal ring guard 18 and upper bellows guard 58 may be fabricated from materials similar to those used for lower bellows guard 16, i.e., woven wire mesh, expanded metal screening, perforated metal sheeting, etc.

It should also be noted that since a portion of the heat dissipated in both upper and lower bellows 10 and 11 will be by convection of the gases surrounding said bellows, a plurality of ventilation holes 59 are provided proximate the outer periphery of top plate portion 56 between the point of attachment of upper bellows guard 58 and upper bellows 10, thus affording the heated gases to rise and circulate freely about the folds of upper bellows 10.

To the inner periphery of upper seal ring 12 is affixed and sealed as by welding or the like upper seal telescoping guide 19. Upper seal telescoping guide 19 is arranged to have a minimum inside diameter approximately equal to the minimum inside diameter of lower seal telescoping ring 17. The lower portion of upper seal telescoping guide 19 is further arranged to slide telescopically along the inner face 20 of the upper portion of lower seal telescoping ring 17 while the upper portion of upper seal telescoping guide 19 is arranged to slide telescopically along the outer face 21 of the lower portion of top plate bellows guide 57.

Although other means may be used to hold down reactor vessel cover 50, in the present embodiment the weight of said cover 50 is utilized to provide the force necessary to compress upper and lower bellows 10 and 11, and in order to prevent excessive compression, a cover support ring 60 is provided proximate the periphery of the bottom of cover 50 which is arranged to rest on cover support ledge 61 projecting inwardly from reactor vessel wall 51. Reactor vessel cover 50 is made heavy through the use of a plurality of radiation shield laminations 62 between which are sandwiched radiation shield insulation laminations 63. Such material may consist of boron steel, depleted uranium, travertine or other material common in the art. Radiation shield vessel wall 55 besides providing containment for the radiation and insulation shield laminations 62 and 63, also acts as a supporting structure for top plate portion 56 and more importantly, a rigid stop means for preventing over-compression of upper and lower bellows 10 and 11. To add still more weight to reactor vessel cover 50, a plurality of strong backs 64 in the present embodiment are placed on top of said cover 50. Guide bolts 65 are used to prevent sideways motion of the strong backs and cover combination should reactor vessel cover 50 be lifted by an over-pressure transient.

It should be further noted that the preferred location of ring seal 15 is near the inner periphery of seal ring 13 (or 12 as the case may be) in that the bellows will follow the pressure to increase the compressive force against both seal rings 12 or 13. In other words, the internal pressure will tend to expand the bellows thus forcing seal rings 12 and 13 together. By placing ring seal 15 near the inner periphery of the seal ring, a greater area is available upon which the internal pressure may act against the external atmospheric pressure.

When reactor vessel cover 50 is removed from reactor containment vessel 52, upper bellows 10 will become extended as will lower bellows 11. In addition, upper seal telescoping guide 19, as well as lower seal telescoping ring 17, will be extended to the limit of their travel but are arranged to still overlap the members against which they slide. The end of bent-up portion 22 of upper seal ring guard 18 should be overlapping slightly or be even with the bottom of upper bellows guard 58. When reactor vessel cover 50 is placed over the reactor containment vessel 52 and gradually lowered, intromitting the lower portion of upper seal telescoping guide 19 inside the upper portion of lower seal telescoping ring 17, upper seal ring 12 will first make contact with quadrant ring seal 15 and begin compressing it until upper seal ring 12 meets lower seal ring 13. As reactor vessel cover 50 continues to be lowered in place, upper seal telescoping guide 19 will slide up along top plate bellows guide 57 while lower seal telescoping ring 17 will slide down along rabbeted portion 54 in reactor vessel wall 51 immediately below top lip 53.

When cover support ring 60 meets and rests on cover support ledge 61, downward motion of reactor vessel cover 50 will be arrested and compressive forces exerted by upper and lower bellows 10 and 11 will remain constant to effect a tight seal. Thus, the seal formed by quadrant seal ring 15 and upper and lower seal rings 12 and 13 will "float" between upper and lower bellows 10 and 11, reaching an equilibrium when the forces in both bellows are equal.

The bellows members are fabricated of suitably deeply convoluted stainless steel or other metal adapted for high temperature operation and having sufficient elasticity to provide the aforesaid spring actions. Seal rings 12, 13, may be made of similar metal and of a cross-section of small dimension to provide circumferential flexibility. It will be appreciated that since the seal rings are "floating," i.e., supported between the compliant bellows portions, variations of flatness and parallelism in upper and lower seal rings 12 and 13 will be compensated for by the ability, through flexibility, of the two bellows to apply compressive forces to said rings 12 and 13 evenly about their circumference. Thus, where the seal rings are spread axially apart due to lack of parallelism or flatness between the two mating surfaces of seal rings 12 and 13 the forces of the bellows, coupled with its flexibility along with the flexibility of the seal rings will close the gap and maintain an effective seal.

As the reactor begins to operate, both reactor vessel wall 51 and reactor vessel cover 50 will increase in temperature. For sodium-cooled reactors the temperature may be high of the order of 300–400° C. Since both upper and lower bellows 10 and 11 are affixed to top plate portion 56 of reactor cover 50 and reactor vessel wall 51 respectively, a heat conduction path is established traveling through said upper and lower bellows 10 and 11 toward upper and lower seal rings 12 and 13. It will be appreciated that upper and lower bellows 10 and 11 by virtue of their thin wall construction providing thermal resistance to the heat conductive path and the fold configurations will afford a large surface area for the dissipation of heat by both convective and radiative means. Thus, a significant portion of the heat will be lost before reaching seal rings 12 and 13, especially quadrant ring seal 15, resulting in a lower temperature for said seal rings 12, 13 and quadrant seal 15. Therefore, sealing material used in quadrant ring seal 15 or any other appropriate seal ring configuration; for example, silicone rubber, O rings or the like, need not be required to withstand temperatures as high as those encountered by a seal ring in contact with the wall 52 and cover 50 portions of the reactor containment vessel. Thus, for the embodiment of this invention above described, a seal is maintained for a reactor vessel whereby the reactor vessel cover may be removed and replaced without the necessity for disengaging numerous clamps or the like to release the seal.

Although the foregoing embodiment has been described in detail, there are obviously many other embodiments and variations in configuration which can be made by a person skilled in the art without departing from the spirit, scope, or principle of this invention. Therefore, this invention is not to be limited except in accordance with the scope of the appended claims.

What is claimed is:

1. A nuclear reactor core containment vessel comprising in combination means defining a pressure resistant vessel having top access port means, means defining a cover for said top access port, a first flexible bellows means sealed and affixed at one end to said cover, a planar seal flange means proximate the end of said first bellows distal attachment to said cover, a second flexible bellows means sealed and affixed at one end to said pressure resistant vessel proximate said top access port, a planar seal flange comprising an annular seal ring having a concentric annular chase in the chase thereof, and flexible gasket means disposed in said face, said planar seal flange attached proximate the end of said second bellows distal the attachment to said pressure resistant vessel and said top access port mating with said first bellows planar seal means, and stop means limiting compressive deflection of said first and second bellows together forming a vessel closure floating flange.

2. A nuclear reactor core containment vessel comprising in combination means defining a pressure resistant vessel having top access port, means defining a cover for said top access port, a first flexible bellows means sealed and affixed to said cover, a first annular ring means having a smooth planar face, said first annular ring sealed and affixed to the end of said first bellows distal cover, a second flexible bellows means sealed and affixed to said pressure resistant vessel, proximate said top access port, a second annular ring means having a smooth planar face for mating in sealing relationship with said first annular ring, said second annular ring affixed and sealed to the end of said second flexible bellows distal said pressure resistant vessel and said top access port and stop means limiting compressive deflection of said first and second bellows together forming a vessel closure floating flange.

3. A nuclear reactor core containment vessel comprising in combination means defining a pressure resistant vessel having top access port means, means defining a cover for said top access port, a first flexible bellows means sealed and affixed to said cover, a first annular ring means having a smooth planar face, said first annular ring sealed and affixed to the end of said first bellows distal said cover, a second flexible bellows means sealed and affixed to said pressure resistant vessel proximate said top access port, a second annular ring means having a smooth planar face for mating in sealed relationship with said first annular ring, said second annular ring affixed and sealed to the end of said second flexible bellows distal said pressure resistant vessel and said top access port, an annular chase means concentric with and in said smooth planar face of said second annular ring, flexible gasket means in said annular chase for providing a pressure resistant seal and bracket means stopping downward travel of said cover, limiting compressive deflection of said first and second bellows together forming a vessel closure floating flange.

4. A nuclear reactor core containment vessel comprising in combination means defining a pressure resistant vessel, a top access port having vertical sides and a horizontal planar lip proximate the top of said pressure resistant vessel; means defining a cover for said top access port, a first flexible bellows means sealed and affixed proximate the periphery of said cover, a second flexible bellows means sealed and affixed to said pressure resistant vessel proximate said top access opening on the exterior of said vertical sides, a first annular seal ring means sealed and affixed to the end of said first bellows distal said cover and having a smooth planar mating face, a second annular seal ring means sealed and affixed to the end of said second bellows distal said pressure resistant vessel and having a smooth planar face for mating with said mating face of said first annular ring and stop means limiting compressive deflection of said first and second bellows together forming a vessel closure floating flange.

5. The apparatus as defined in claim 4 wherein said second annular seal ring further comprises a concentric annular chase in said mating face thereof and flexible gasket means in said annular chase for providing a pressure resistant seal.

6. The apparatus as defined in claim 4 wherein said first annular seal ring further comprises a concentric annular chase in said mating face thereof and flexible gasket means in said annular chase for providing a pressure resistant seal.

7. A nuclear reactor core containment vessel comprising in combination means defining a pressure resistant vessel having a top access port means, means defining a cover for said top access port, a first flexible bellows means sealed and affixed proximate the periphery of said cover, a first bellows guide means tangent the inner periphery of said first bellows, a first bellows protective guard means exterior and spaced apart from said first bellows, a second flexible bellows means sealed and affixed to said pressure resistant vessel proximate said top access port on the exterior of said vessel, a first annular seal ring means sealed and affixed to the end of said first bellows distal said cover and having a smooth planar mating face, a second annular seal ring means sealed and affixed to the end of said second bellows distal said pressure resistant vessel and having a smooth planar face for mating with said mating face of said first annular seal ring, an annular concentric chase in the mating face of said second annular seal ring, flexible gasket means in said annular chase for providing a pressure resistant seal, a telescoping guide means affixed proximate the inner periphery of said second annular ring and extending along the inner face of said top access port to prevent intrusion of material into said bellows, a second bellows protective guard means affixed proximate the outer periphery of said second annular seal ring and extending downward in spaced apart relationship with said second bellows means for preventing damage to said bellows, and bracket means stopping downward travel of said cover limiting compressive deflection of said first and second bellows together forming a vessel closure floating flange.

8. A nuclear reactor core containment vessel comprising in combination, means defining a pressure resistant vessel having a top access port means, means defining a cover for said top access port, a first flexible bellows means sealed and affixed proximate the periphery of said cover, a first bellows guide means tangent the inner periphery of said first bellows, a first bellows protective guard means exterior and spaced apart from said first bellows, a second flexible bellows means sealed and affixed to said pressure resistant vessel proximate said top access port on the exterior of said vessel, a first annular seal ring means sealed and affixed to the end of said first bellows distal said cover and having a smooth planar mating face, an annular concentric chase in the mating face of said first annular ring, flexible gasket means in said annular chase for providing a pressure resistant seal, a second annular seal ring means sealed and affixed to the end of said second bellows distal said pressure resistant vessel and having a smooth planar face for mating with said mating face of said first annular seal ring, a telescoping guide means affixed proximate the inner periphery of said second annular ring and extending along the inner face of said top access port to prevent intrusion of material into said bellows, a second bellows protective guard means affixed proximate the outer periphery of said second annular seal ring and extending downward in spaced apart relationship with said second bellows means for preventing damage to said bellows and bracket means stopping downward travel of said cover limiting compressive deflection of said first and second bellows together forming a vessel closure floating flange.

References Cited

UNITED STATES PATENTS 2,975,115   3/1961   Wigner et al. _____ 176—87

THERON E. CONDON, *Primary Examiner.*

JAMES B. MARBERT, *Examiner.*